Jan. 23, 1934.   A. E. RICE ET AL   1,944,463
SINGLE SHAFT GEAR DRIVEN DRAWWORKS
Filed June 29, 1931   3 Sheets-Sheet 1
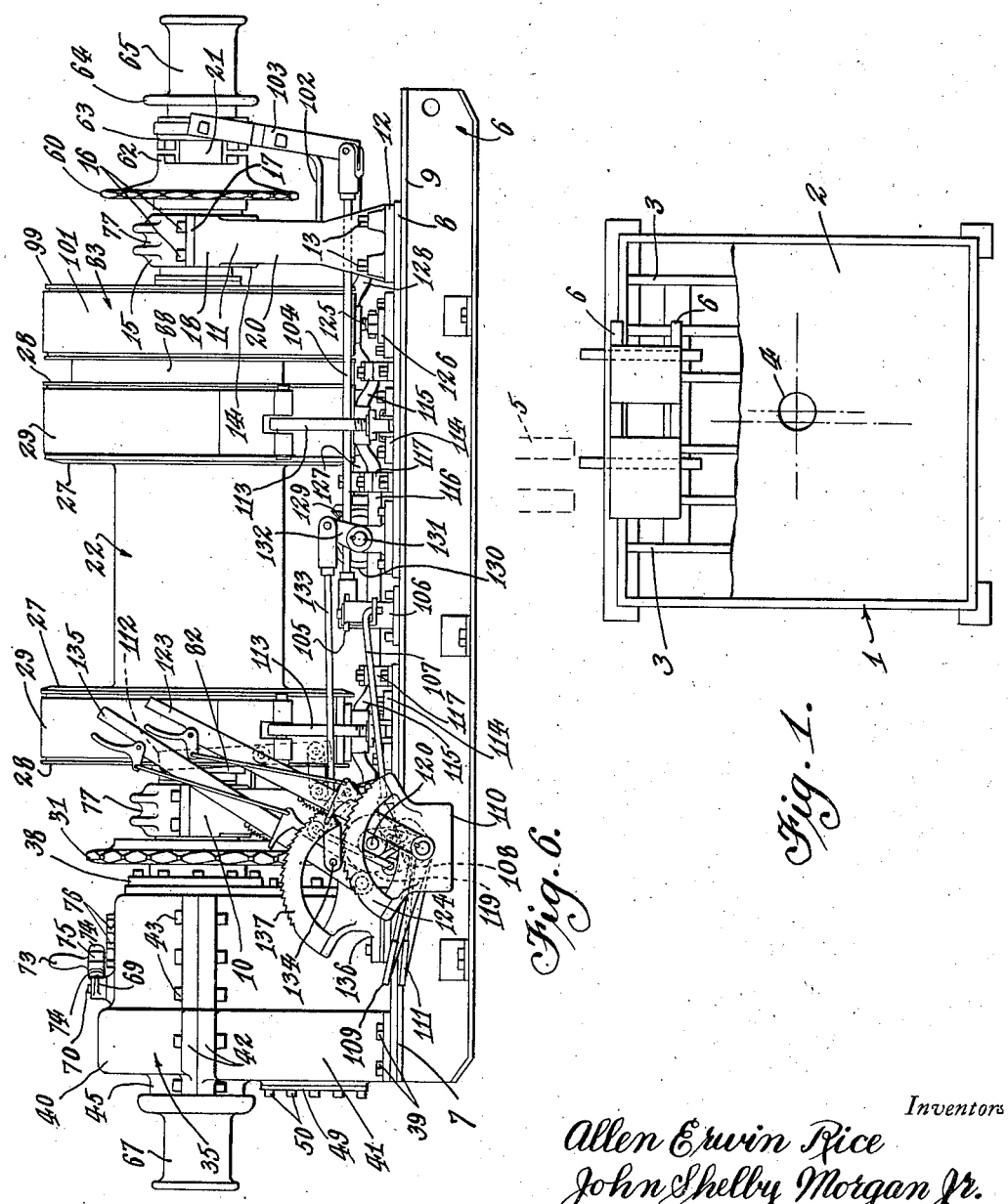
Inventors
Allen Erwin Rice
John Shelby Morgan Jr.
By Lyon & Lyon
Attorneys

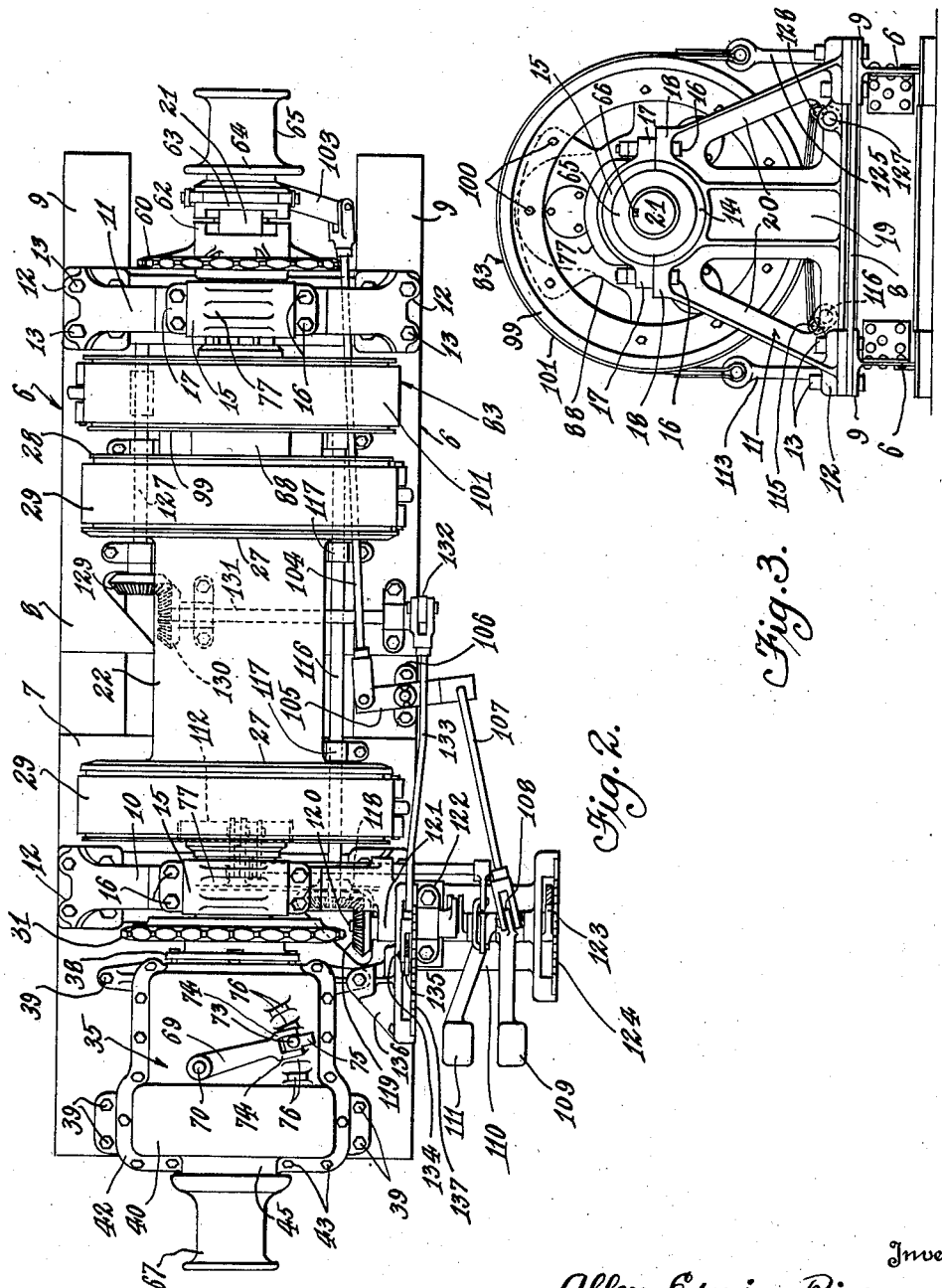

Jan. 23, 1934.  A. E. RICE ET AL  1,944,463
SINGLE SHAFT GEAR DRIVEN DRAWWORKS
Filed June 29, 1931  3 Sheets-Sheet 3
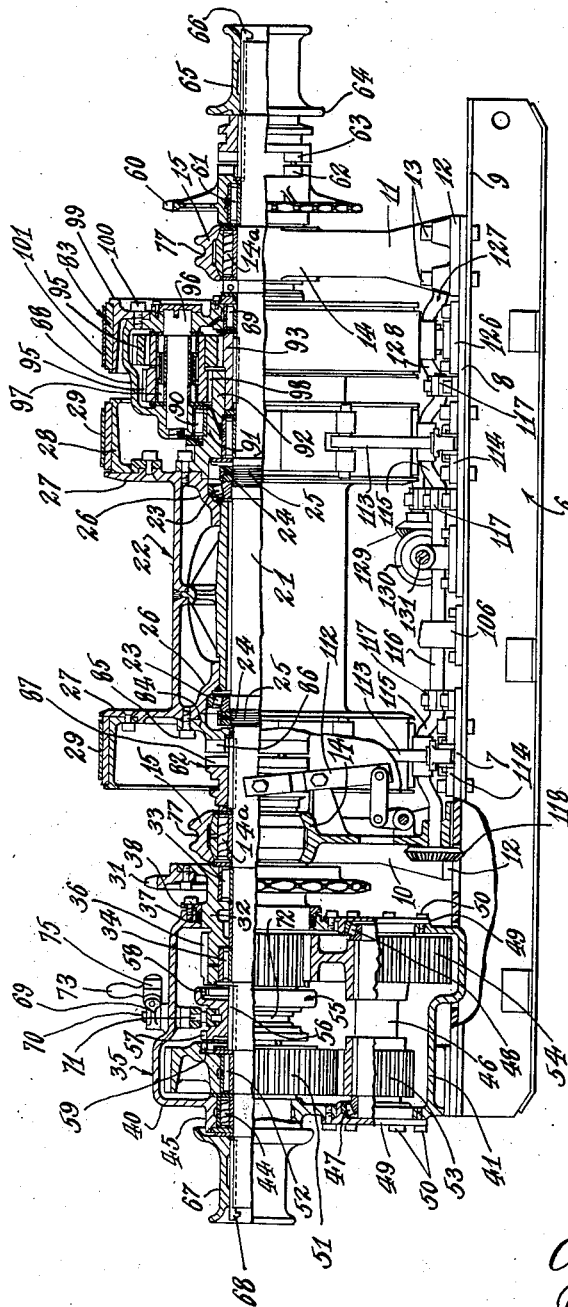
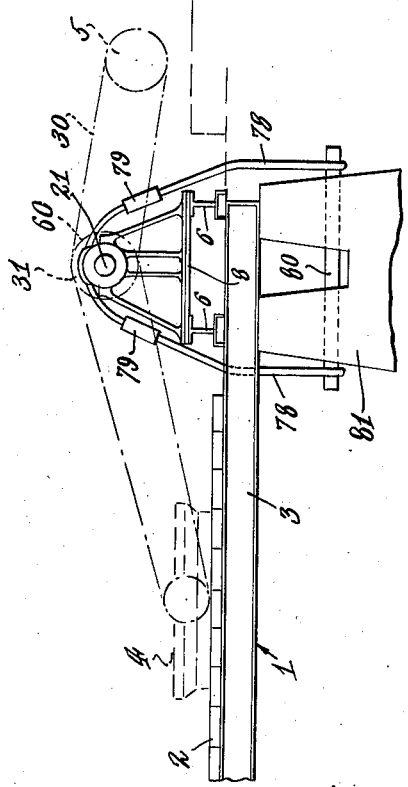
Inventors
Allen Erwin Rice
John Shelby Morgan Jr.
By Lyon & Lyon
Attorneys Patented Jan. 23, 1934

1,944,463

UNITED STATES PATENT OFFICE 1,944,463

SINGLE SHAFT GEAR DRIVEN DRAWWORKS

Allen Erwin Rice, Palos Verdes, and John Shelby Morgan, Jr., Inglewood, Calif., assignors to The National Supply Company, Toledo, Ohio, a corporation of Ohio Application June 29, 1931. Serial No. 547,588
16 Claims. (Cl. 255—19)

This invention relates to single shaft gear driven drawworks, and more particularly to the provision of a rotary drawworks for use in connection with the rotary apparatus for drilling a well, and which drawworks includes a single shaft on which there is journaled the hoisting drum of the drawworks, and which shaft likewise provides a means for coupling the prime mover with the rotary machine for driving the same at variable speeds.

In the construction of a rotary drawworks for use in connection with apparatus for drilling wells following the rotary process, it has heretofore been the practice to employ a drawworks constructed to include two or three posts upon which there has been supported a drumshaft, a lineshaft, and in some instances a jackshaft, the three shafts being coupled together in a manner to provide a variable speed connection to the drumshaft and to provide a means for driving a rotary machine either from the lineshaft or from the jackshaft independently of the drum supporting shaft.

Drawworks of this type include sprocket drives connected by chains which drive from one shaft to the other and are not only expensive in construction and in operation due to the expense of maintaining the heavy chains and the like, but are somewhat hazardous in their operation due to the extremely high loads which are subjected to the chains, resulting in the chains many times becoming overloaded and breaking during the operation of the drawworks.

A drawworks of the two or three post type is also not portable but is assembled in position in the drilling rig and can only be removed therefrom at considerable expense and can only be set up in a second rig after extreme care has been taken to properly align the posts of the drawworks and to position the controls therefor in relation to the drawworks as positioned. This inability to remove and reset drawworks of the two or three post type is particularly true with reference to large drawworks constructions constructed to handle casings or drill pipes of many thousand feet in length wherein the drums of the drawworks are constructed of a large size and the entire drawworks is proportionately increased in size.

It is therefore an object of this invention to provide a rotary drawworks which may be assembled as a unit and aligned as assembled at a central manufacturing plant, and which, when assembled, needs only to be positioned within a drilling rig and suitably anchored therein for operation, and which, when the drilling in such rig has been discontinued, may be removed therefrom without disturbing the alignment of the parts of the drawworks by simply releasing the anchors provided for holding the structure within such a drilling rig.

Another object of this invention is to provide a rotary drawworks wherein the use of a multiple shaft construction is eliminated, and a drawworks is provided which includes a single shaft providing a countershaft for the driving of the rotary machine from the prime mover, and likewise providing a rotatably supporting drum shaft upon which a drum is journaled, and which shaft is provided with multiple speed transmission between the prime mover and the shaft for driving either the rotary drum or the rotary drive sprocket at variable speeds.

Another object of this invention is to provide a simplified form of rotary drawworks which includes a single shaft rotatably supported on pedestals secured to the base structure, and which single shaft rotatably supports a free running drum provided at one end with a transmission for driving the shaft at different speeds, and provided at its opposed end with a rotary drive sprocket.

Other objects and advantages of this invention it is believed will be apparent from the following detailed description of a preferred embodiment thereof as illustrated in the accompanying drawings.

In the drawings:

Figure 1 is a diagrammatic view of an oil well rig illustrating the position of the base structure of the rotary drawworks embodying our invention as mounted therein in relation to the rotary table, and illustrating the drawworks structure as removed to show the positioning of the base of the drawworks more clearly in the rig.

Figure 2 is a top plan view of the rotary drawworks embodying our invention.

Figure 3 is an end elevation thereof looking from the right-hand end of Figure 2.

Figure 4 is a diagrammatic view illustrating the positioning and driving of the rotary drawworks embodying our invention within the drilling rig.

Figure 5 is a front elevation partly in vertical mid-section of a rotary drawworks embodying our invention.

Figure 6 is a front elevation of the rotary drawworks embodying our invention illustrating the positioning of the controls therefor.

In the preferred embodiment of our invention as disclosed in the accompanying drawings, 1 indicates a derrick having a floor 2 supported by sills 3. 4 indicates a rotary machine, and 5 indicates the position of an engine or prime mover utilized for the purpose of driving the rotary drawworks embodying our invention and the rotary machine 4 through the rotary drawworks.

The drawworks embodying our invention is positioned between the prime mover 5 and the rotary machine 4 within the derrick 1 and preferably includes a base structure upon which the structure of the drawworks is mounted to form the drawworks as a portable unit which may be readily installed on the floor sills 3 of the derrick 1 and removed therefrom without requiring the alignment of supporting posts of the drawworks or the alignment and positioning of the controls for the drawworks, and the base structure includes a pair of spaced supporting beams 6 which are adapted to be mounted upon and supported by the spaced sills 3 of the derrick 1. The spaced beams 6 are connected together by means of base plates 7 and 8 which are secured to the upper flanges 9 of the beams 6 in any suitable or desirable manner. Mounted upon the base plates 7 and 8 are cast pedestals 10 and 11. The pedestals 10 and 11 are cast to provide base standards 12 which are secured by means of bolts 13 to the transverse webs 9 of the beams 6. The pedestals 10 and 11 are cast to provide split bearing boxes at their upper ends, the bearing boxes being illustrated at 14 and being provided with caps 15 secured to bearing boxes 14 by means of flange bolts 16 to pass through the flanges 17 of the caps 15, and through flanges 18 of the pedestal structure. The pedestals 10 and 11 are cast to provide central pedestals 19 and braces 20 connecting the flanges 18 with the outer ends of the base portion 12 of the pedestals.

The single shaft 21 of the rotary drawworks embodying our invention is supported in bearings 14a mounted in the bearing boxes 14 formed at the upper end of the spaced pedestals 10 and 11 and projects longitudinally from each end of the pedestals 10 and 11.

Journaled on the shaft 21 is a hoisting drum 22 which is preferably rotatably supported on the shaft 21 upon roller bearings 23 which are adjustably mounted upon the shaft 21 by means of bearing collars 24 which are threaded upon enlarged portions 25 of the shaft 21 and are adjustable longitudinally of the shaft 21 to adjust the position of the roller bearings 23. The roller bearings 23 are positioned within the spooling portion of the drum 22 and engage annular bearing webs 26 which project inwardly from the opposed ends of the spooling portion of the drum 22 toward the center thereof.

The hoisting drum 22 may be of any suitable or desirable construction well understood in the art and is herein illustrated as of the type shown in the patent to Edward Timbs, No. 1,670,600, issued May 22, 1928, for Two piece drum for rotary drawworks. The drum includes a pair of spaced flanges 27 formed integral with the spooling portion of the drum 22. The flanges 27 are provided with brake rims 28 at their outer ends upon which brake bands 29 are mounted. The improved form of two-piece drums as disclosed specifically by Figure 5 hereof is the subject of a divisional application.

The rotary drawworks embodying our invention is driven from the prime mover or engine 5 by a connection from the prime mover 5, including a chain 30 which is mounted on the drive sprocket of the engine 5 and is trained over a drive sprocket 31.

The drive sprocket 31 is journaled on the shaft 21 and is provided with an elongated hub 32 which is supported on the shaft 21 by means of roller bearings 33 and 34. The elongated hub 32 extends into the change gear transmission housing 35 and is formed at its inner projecting end with gear teeth to provide the driven gear 36 of the change speed transmission mounted on the single shaft 21 of the drawworks.

A packing gland is formed in the annular flange 37 of the housing 35 through which the hub 32 of the gear 36 extends, and a packing gland follower 38 is adjustably secured to the annular flange 37 by means of bolts to form a fluid-tight joint between the housing 35 and the extension 32 of the engine drive sprocket. The housing 35 is supported upon the base plate 7 between the skids 6 by means of bolts 39 which are passed through the base plate 7 and through the transverse flanges 9 of the skids 6. The housing 35 is formed in two sections provided substantially on the longitudinal axis of the shaft 21 to provide a cap 40 and a base housing 41. Two sections 40 and 41 of the housing are secured together at complementary flanges 42 through which bolts 43 are passed. The shaft 21 is journaled on bearings 44 supported within split bearing flange 45 formed between the cap 40 and the base portion 41 of the housing 35 adjacent its outer end.

Journaled within the housing 35 is a change speed transmission shaft 46 which is journaled in bearings 47 and 48 at its opposed ends.

In order to provide for the removability of the change speed transmission shaft 46, the bearings 47 and 48 are supported within flanged cover plates 49 secured over openings formed in the base portion 41 of the housing 35. The cover plates 49 are secured to the housing 35 by means of bolts 50. When assembled, the housing 35 provides a fluid-tight housing within which lubricant may be retained for maintaining the gears of the change speed transmission at all times running in a suitable lubricant.

The change speed transmission mounted within the housing 35 provides for two different rates of drive of the shaft 21. The low speed drive is through the low speed gear 51 journaled on roller bearings 52 on the shaft 21 which meshes with a pinion 53 secured to the change speed transmission shaft 46. Secured to the change speed transmission shaft 46 is a driving pinion 54 which is at all times in mesh with the gear teeth formed on the extension 32 of the engine drive sprocket 31. The method of drive in this instance is from gear 36 through the gear 54 to the low speed pinion 53 to the low speed drive gear 51, thus driving the low speed drive gear 51.

The double faced clutch gear 55 is mounted on the shaft 21 on a spline 56 between the gears 36 and 51. The double faced clutch gear 55 is provided with gear teeth 57 and 58 at its opposed ends so that when the double faced gear 55 is shifted along the shaft 21 so that its teeth 57 engage the internal teeth 59 of the low speed drive gear 51, the shaft 21 is driven from the gear 51. When the clutch gear 55 is moved in a reverse direction so that its gear teeth 58 engage the gear teeth 36, a direct drive is provided from the sprocket 31 through the gear 55 to the shaft 21, and the shaft 21 is driven at the speed at which the sprocket 31 is being driven.

By this means a two-speed drive for the shaft is provided which provides a two-speed drive for the rotary machine drive sprocket 60 which is mounted upon the opposed end of the shaft 21, and likewise provides a two-speed drive for the hoisting drum 22 which is journaled on the shaft 21.

The rotary sprocket 60 is journaled on the shaft 21 in roller bearing 61. The hub of the rotary drive sprocket 60 is provided with a clutch face 62 adapted to be engaged with clutch face of a clutch collar 63 splined on the shaft 21 between the face of the rotary drive sprocket 60 and the inner flange 64 of a cat-head 65. The cat-head 65 is keyed by means of a key 66 to the outer end of the shaft 21.

A cat-head 67 is secured to the opposite end of the shaft 21 by means of a key 68, and provides a means for retaining the bearing 44 from endwise movement along the shaft 21.

In order to shift the clutch gear 55 in spline 56, a shifting lever 69 is provided which is keyed to a shifter shaft 70 provided at its lower end with a clutch gear shifting rod 71 which is movably engaged within an annular recess 72 of the gear 55 so that on rotation of the shaft 70 gear 55 is moved longitudinally of the shaft 21. The shifter shaft 70 extends through the housing 35 and is secured to shifter lever 69 at a point above the housing 35. The latch handle 73 is pivotally secured to the shifter lever 69 between tines of the fork end 74 of said lever 69. The latch handle 73 is provided with a latching dog 75 which is adapted to fit between pairs of latching lugs 76 formed on the surface of the cover 40 of the housing 35 to retain the shifting lever 69 in position to hold the transmission gears in the selected engagement desired by the operator.

In order to hold the drawworks embodying our invention firmly in position within the rig 1, the caps of the bearing boxes of the pedestals 10 and 11 are formed to provide saddles 77 in which tie rods 78 are adapted to seat.

The tie rods 78 are provided with adjustable turn buckles 79 for adjusting their length and are secured to a base rod 80 passed through the piers 81 supporting the beams 3 of the regular structure.

In order to releasably secure the hoisting drum 22 to the shaft 21 so as to enable the hoisting drum 22 to be driven by the shaft 21 at variable speeds, we prefer to provide a direct acting clutch 82 mounted on the shaft 21 at one end of the drum 22, and a planetary reduction gear clutch 83 mounted on the shaft 21 at the opposite end of the drum 22. In this manner the variable speed drive is provided between the hoisting drum 22 and the shaft 21 irrespective of the speed of rotation of the shaft 21, and as the shaft 21 is provided with a variable speed drive, the hoisting drum is operable at multiple of speeds dependent upon the conditions of operation desired. The clutch 82 consists of a clutch gear plate 84 secured to the face of the flange 27 of the drum 22 by means of bolts 85, and provides a clutch jaw 86 adapted to be engaged by the clutch face of the clutch collar 87 which is splined on the shaft 21 between the pedestal 10 and the clutch plate 84.

With the clutch 82 engaged, the drum 22 is driven at the speed of rotation of the shaft 21. As the shaft 21 may be rotated at two speeds, two high speed drives are provided from the drum 22 through the clutch 82. Two low speed drives are provided through the planetary gear clutch 83 providing a friction drive for the low speed drive of the drum. The planetary gear clutch includes a housing 88 which is supported on a bearing 89 mounted on the shaft 21 at the outer end of the housing 88, and upon a roller bearing 90 mounted on the bearing race 91 of the planetary driven gear 92 secured to the right-hand flange 27 of the drum 22 at the inner end of the housing 88. The planet gears 95 are journaled on roller bearings 97 mounted on the planet gear pins 96. The planet gears 95 mesh with the gear teeth 98 of the planetary driven gear 92.

A cast steel brake rim 99 is bolted as indicated at 100 to the housing 88, and a brake band 101 is mounted on the brake rim 99. When the brake band 101 is tightened on the brake rim 99, the rotation of the housing 88 is frictionally retarded or arrested, and the drive is transmitted from the shaft 21 through the gear 93 to planetary gears 95, to planetary drive gear 92 to the hoisting drum 22. Since the planetary gear clutch causes a reduction in speed and is driven by the drum shaft 21 which may be operated at two speeds, two low speed friction drives through the planetary gear clutch 83 are provided.

In order to provide a rotary drawworks which is a self-contained unit, the controls for the rotary clutch 63, planetary gear clutch 83, the operating mechanism for the brake bands 29 and the control for the high speed clutch 82 are all assembled on the base of the rotary drawworks formed by the skids 6 and base plates 7 and 8 at the left end of the drawworks adjacent the operating lever 69 of the change speed transmission.

In order to actuate the clutch 63 for the rotary drive sprocket 60, a bracket 102 is secured to the pedestal 11 and a clutch shifting fork 103 is pivotally secured to the bracket 102. An actuating rod 104 is secured to the clutch fork 103 and extends longitudinally of the drawworks to where it is pivotally secured to a lever 105 pivotally mounted in a bracket 106 secured to the forward beam 6. The opposite end of the lever 105 is secured to a rod 107, which rod is in turn secured to the crank arm 108 of the rotary clutch pedal 109. The rotary clutch pedal 109 is mounted on a shaft supported by a bracket plate 110 secured to the base plate 7 of the base structure of the rotary drawworks in front of the structure. Mounted on the shaft supporting the rotary clutch pedal 109 is a high speed clutch pedal 111 which is operably connected with a high speed clutch shifter fork 112 for shifting the high speed clutch 82 to and from engagement.

The brake bands 29 are anchored at their dead ends by means of anchor bolts 113 adjustably secured to brackets 114 secured to the base plates 7 and 8 respectively. The live ends of the brake bands 29 are secured to the crank portions 115 of a rocker shaft 116. The rocker shaft 116 extends parallel with the axis of the shaft 21 and is supported by bearing brackets 117 secured to the base plates 7 and 8 respectively. The outer end of the rocker shaft 116 is provided with a bevel gear 118 which meshes with a bevel gear 119 secured to brake actuating shaft 120. The brake actuating shaft 120 is supported in bearings 121 and 122 secured to the base plate 7. Secured to the brake actuating shaft 120 is a brake actuating lever 123. A ratchet mechanism 124 is provided for holding the brake actuating lever 123 in adjusted position.

The brake band 101 of the planetary gear clutch 83 has its dead end secured by means of a tie bolt 125 adjustably secured to a bracket 126 secured to the base plate 8. The rocker shaft 127 is pivotally supported in brackets secured to the base plate 8 at the rear of the drawworks structure and provides a crank 128 for actuating the live end of the brake band 101.

A shaft 127 extends longitudinally of the drawworks structure and is provided at its inner end with a bevel gear 129 which meshes with a bevel gear 130 secured to a transverse shaft 131. The transverse shaft 131 is supported in bearing brackets secured to the base structure of the rotary drawworks and extends forwardly of the drawworks structure to the front thereof where it is provided with a crank arm 132. The crank arm 132 is adjustably secured to an actuating rod 133 which extends longitudinally of the drawworks structure and is secured as indicated at 134 to a planetary transmission gear clutch actuating lever 135. The lever 135 is pivotally mounted in a bracket 136 secured to the base plate 7 adjacent bracket 110. A pawl and ratchet mechanism 137 is provided for locking planetary gear clutch lever 135 in adjusted position.

In the manner above set forth all of the controls for the rotary drawworks embodying our invention are positioned at the left end of the rotary drawworks at a point readily accessible by the operator and are all mounted on and supported by the base structure of the rotary drawworks so that a self-contained unit is provided in which the controls do not have to be located after the drawworks is set up in the rig 1.

Having fully described our invention, it is to be understood that we do not wish to be limited to the details herein set forth, but our invention is of the full scope of the appended claims.

We claim:

1. In a rotary drawworks, the combination of a shaft, means for rotatably supporting the shaft, a hoisting drum mounted on the shaft, means mounted on one end of the shaft for driving the shaft at variable speeds, a rotary table drive sprocket mounted on the other end of the shaft, and means for releasably clutching the rotary drive sprocket to the shaft.

2. In a rotary drawworks, the combination of a shaft, means for rotatably supporting the shaft, a hoisting drum journaled on the shaft, clutch means mounted on the shaft for releasably securing the drum to the shaft, means mounted on one end of the shaft for driving the shaft at variable speeds, rotary table drive means mounted on the other end of the shaft, and clutch means for releasably securing the rotary table drive means to the shaft.

3. In a rotary drawworks, the combination of a shaft, a hoisting drum journaled on the shaft, means for rotatably supporting said shaft, a change speed transmission mounted on the shaft for driving the same at a plurality of speeds, releasable means for directly coupling the drum to the shaft at one end of the drum, gear reduction means for releasably driving the drum from the shaft at the other end of the drum, and a rotary table drive means mounted on the shaft.

4. In a rotary drawworks, the combination of a shaft, a hoisting drum journaled on the shaft, means for rotatably supporting said shaft, a change speed transmission drive on the shaft for driving the same at a plurality of speeds, gear reduction means for coupling the drum to the shaft, and a rotary table drive means mounted on the shaft.

5. In a rotary drawworks, the combination of a shaft, a hoisting drum journaled on the shaft, means for rotatably supporting said shaft, a change speed transmission mounted on the shaft at one end for driving the same, a gear reduction means mounted on the shaft for releasably driving the drum from the shaft, and a rotary table drive means mounted on the other end of the shaft.

6. In a rotary drawworks, the combination of a shaft, a hoisting drum journaled on the shaft, means for rotatably supporting said shaft, means mounted on the shaft at one end for driving the shaft at a plurality of speeds, means for releasably directly coupling the drum with the shaft at one end of the drum, reduction means for coupling the drum to the shaft at the other end of the drum, and a rotary table drive means mounted on the other end of the shaft.

7. In a rotary drawworks, the combination of a supporting base including a pair of skids, a pair of pedestals secured to the skids, a shaft rotatably supported by the pedestals, a hoisting drum journaled on the shaft, means at one end of the shaft for driving the shaft at a plurality of speeds, a rotary table drive means at the other end of the shaft, means for releasably coupling the rotary drive sprocket to the said shaft, and means for releasably coupling the drum to the shaft.

8. In a rotary drawworks, the combination of a shaft, a hoisting drum rotatably supported on the shaft, means for rotatably supporting the shaft at the ends of said drum, means for releasably directly coupling the drum at one end to the shaft, said means being located between the supporting means and the end of the hoisting drum, reduction means at the other end of the drum between said end of the drum and the supporting means for releasably driving the drum with the shaft, means on one end of said shaft projecting from said supporting means for driving said shaft at a plurality of speeds and rotary table drive means on the other projecting end of said shaft beyond said supporting means.

9. In a rotary drawworks, the combination of a pair of pedestals, a shaft journaled in bearings on said pedestals, a hoisting drum journaled on the shaft between said pedestals, a speed reduction gear on said shaft between one end of the drum and said pedestal for releasably coupling the drum to the shaft so that the drum is driven from the shaft at reduced speed, the shaft projecting beyond the said pedestals, a rotary table drive means releasably secured to one projecting end of said shaft, and means mounted on and releasably secured to the other projecting end of said shaft for driving said shaft at a plurality of speeds.

10. In a rotary drawworks including a single shaft, means for rotatably supporting said shaft, a hoisting drum journaled on said shaft between the supporting means, a change speed transmission drive on the shaft for driving the same at a plurality of speeds, a gear reduction means for coupling the drum to the shaft, a rotary table drive means mounted on the shaft, and catheads mounted on the shaft at the ends thereof beyond the change speed transmission and rotary table drive means respectively.

11. In a rotary drawworks, the combination of a single shaft, means for rotatably supporting said shaft, a hoisting drum journaled on said shaft between said supporting means, an engine drive sprocket journaled on said shaft, change speed gear drive means mounted on said shaft for driving the shaft at a plurality of speeds from said engine drive sprocket, means for directly coupling the drum to the shaft, gear reduction means for coupling said drum with the shaft, and a rotary table drive means mounted on the shaft.

12. In a rotary drawworks, the combination of a single shaft, means for rotatably supporting said shaft, a hoisting drum mounted on said shaft between said supports, a change speed drive transmission mounted on the shaft at one end thereof to drive the shaft at a plurality of speeds, and a rotary table drive means releasably secured to the other end of said shaft.

13. In a rotary drawworks, the combination of a single shaft, means for rotatably supporting said shaft, a hoisting drum mounted on said shaft between said supports, a change speed drive transmission mounted on one end of said shaft beyond said supporting means for driving the shaft at a plurality of speeds, and a rotary table drive means releasably secured to the other end of said shaft beyond said supporting means.

14. In a rotary drawworks, the combination of a single shaft, means for rotatably supporting said shaft, a hoisting drum mounted on said shaft between said supports, a change speed drive transmission mounted on one end of said shaft beyond said supporting means for driving the shaft at a plurality of speeds, a rotary table drive means releasably secured to the other end of said shaft beyond said supporting means, and a cathead secured to each end of said shaft beyond the said transmission and rotary table drive means respectively.

15. In a rotary drawworks, a single shaft, a pair of pedestals, bearings at the upper ends of said pedestals in which said shaft is journaled, the bearings being housed in bearing boxes including caps removably secured to said pedestals, and tie means operatively engaging said caps for tying said drawworks in position in a derrick.

16. In a rotary drawworks, the combination of a single shaft, a drum journaled on the shaft, means for rotatably supporting said shaft including a pair of skids, and base plates mounted on the skids, a change speed transmission mounted on the shaft at one end for driving the shaft at a plurality of speeds, a rotary table drive sprocket mounted on the other end of the shaft, clutch means for releasably clutching the rotary table drive sprocket to the shaft, clutch means for directly clutching the drum to the shaft, a friction drive reduction means for clutching the drum to the shaft, means mounted on the base plates and operable from the transmission end of the shaft for actuating the rotary sprocket clutch, means mounted on the base plates and operable from the transmission end of the shaft for actuating the friction drive reduction clutch, and means mounted on one of the plates at the transmission end of the shaft for actuating the clutch means for directly coupling the shaft with the drum.

ALLEN ERWIN RICE.
JOHN SHELBY MORGAN, Jr.